United States Patent [19]
McNay

[11] Patent Number: 5,654,766
[45] Date of Patent: Aug. 5, 1997

[54] TELEVISION TUNING SYSTEMS AND METHODS EMPLOYING USE OF GHOST CANCELLATION AND ANTENNA DIRECTIONALITY CONTROL TO PRODUCE A GHOST-FREE TELEVISION SIGNAL

[75] Inventor: Steven Ralph McNay, Seymour, Tenn.

[73] Assignee: Philips Electronics North America Corporation, New York, N.Y.

[21] Appl. No.: 496,719

[22] Filed: Jun. 29, 1995

[51] Int. Cl.$^6$ .................................................. H04N 5/21
[52] U.S. Cl. ..................... 348/614; 348/731; 455/193.1; 455/284
[58] Field of Search ........................... 348/725, 731, 348/735, 607, 611, 614; 455/193.1, 283, 284, 286, 289; 342/75, 77, 96, 97, 98, 149, 159; H04N 5/21

[56] References Cited

U.S. PATENT DOCUMENTS

| | | | |
|---|---|---|---|
| 4,797,950 | 1/1989 | Rilling | 455/276 |
| 5,047,859 | 9/1991 | Koo | 358/187 |
| 5,111,298 | 5/1992 | Koo | 358/187 |
| 5,119,196 | 6/1992 | Ayanoglu et al. | 348/614 |
| 5,121,211 | 6/1992 | Koo | 358/187 |
| 5,172,232 | 12/1992 | Koo | 358/187 |
| 5,233,424 | 8/1993 | Nuimura | 348/607 |
| 5,300,935 | 4/1994 | Yu | 348/731 |
| 5,428,405 | 6/1995 | Lee | 348/731 |
| 5,483,688 | 1/1996 | English | 455/193.1 |

OTHER PUBLICATIONS

W. Cicora et al, "A Tutorial on Ghost Cancelling in Television Systems", vol. CE-25, No. 1, pp. 9-44 (Feb. 1979).

J. Huang, "A Ghost Cancellation System for the NTSC Television", IEEE Trans. on Consumer Electronics, vol. 39, No. 4, (Nov. 1993) pp. 896-904.

S. McNay, "Ghost Cancellation Implementation in Television and VCR", presented Jun. 7, 1995 at the International Conference on Consumer Electronics in Chicago, IL, Jun. 5-7, 1995 (to be published in the ICCE Digest of Technical Papers, IEEE Cat. #95CH35719, ISBN 0-7803-2140-5, -2141-3,2142-1, Library of Congress 84-643147).

*Primary Examiner*—Michael H. Lee
*Assistant Examiner*—Jeffrey S. Murrell
*Attorney, Agent, or Firm*—Richard A. Weiss

[57] ABSTRACT

Television tuning systems and methods employing use of ghost cancellation and antenna directionality control to produce a ghost-free television signal. The invention employs use of a antenna whose directionality can be changed to change reception quality of a received television signal, and a baseband ghost cancellation unit which can perform baseband ghost cancellation. In a first embodiment of the invention, the directionality of the antenna is changed so that a television signal of sufficient reception quality is received from which a ghost-free television signal can be produced therefrom by the baseband ghost cancellation unit. A second embodiment of the invention further employs use of a tuner, and involves controlling the directionality of the antenna and the tuning frequency of the tuner so that a tuned television signal is produced which is properly tuned and of sufficient quality that a properly tuned ghost-free television signal can be produced therefrom by the baseband ghost cancellation unit. Both of the first and second embodiments can be used to obtain the antenna directionality setting and ghost cancellation coefficients which will produce a ghost-free television signal, and the tuning frequency setting which in combination with the antenna directionality setting and ghost cancellation coefficients will produce a properly tuned ghost-free television signal. A third embodiment of the invention further employs use of a storage device for storing the antenna directionality setting, (tuning frequency setting) and possibly, the ghost cancellation coefficients which enable production of a (properly tuned) ghost-free television signal.

31 Claims, 5 Drawing Sheets

TELEVISION TUNING SYSTEMS AND METHODS EMPLOYING USE OF GHOST CANCELLATION AND ANTENNA DIRECTIONALITY CONTROL TO PRODUCE A GHOST-FREE TELEVISION SIGNAL

BACKGROUND OF THE INVENTION

1. Field of the Invention

The invention relates to television tuning systems and methods, and in particular to television tuning systems and methods employing use of ghost cancellation and antenna directionality control to produce a television signal from which images which are substantially ghost-free can be obtained.

2. Description of Related Art

Despite the fact that cable television installations are on the rise and more and more televisions are receiving television signals from cable, there is still a significant number of televisions, including an increasing number of portable televisions, which receive television signals "from the air" via antennas. The images which appear on the display of a television which receives television signals "from the air" are often bothered by echoes, commonly referred to as "ghosts". Such ghosts occur as a result of a transmitted original television signal being interfered with and altered by other signals, e.g., reflected signals resulting from reflections of the transmitted original television signal by tall buildings and/or mountains, as the transmitted original television signal travels "through the air". Such reflected signals have different delay times and amplitudes than the transmitted original television signal, causing the images which are displayed on a television display from a received television signal (which has been interfered with and altered) to have superimposed copies thereof, i.e., ghosts. These ghosts are classified as pre-ghosts and post-ghosts depending on whether the signals of the received television signal which produce them are received before or after the main signal of the received television signal which corresponds substantially to the transmitted original television signal.

Until recently, the only approach available for trying to eliminate ghosts from a television which receives television signals "from the air" was to change the reception characteristics of the television's antenna, and thereby the reception quality of the television signals received, by either physically rotating the antenna (if it is a rotatable antenna) or adjusting the electronic phase of the antenna (if it is a phase adjustable antenna). (The position or phase of an antenna is hereafter referred to as the "directionality" of the antenna, and rotating the position or adjusting the phase of an antenna is hereinafter referred to as "changing the directionality" of the antenna.) Under this antenna directionality change approach (hereinafter referred to as the "adc approach"), a viewer changes the directionality of an antenna until reception of ghosts is minimized and/or reception of the main signal is maximized. In general, this is a trial and error procedure which often only minimizes, rather than solves, the ghosting problem. In addition, each time the directionality of the antenna is changed, it may be necessary for a tuner which is used in the process of obtaining images, from a television signal received by the television for a selected channel, on a television display to change its tuning frequency. (It is noted that each channel has a different television signal associated with it.) Still further, since the characteristics of a transmission path varies from channel to channel, changing the directionality of the antenna is usually necessary whenever a different channel is selected by a the viewer.

Recently, a second approach for trying to eliminate ghosts was developed. This second approach (hereinafter referred to as the "baseband approach") involves performing a ghost cancellation operation on a television signal after it has been received and demodulated, i.e., at baseband. A good overview to this approach can be found in W. Ciciora et al., "A Tutorial On Ghost Cancelling in Television Systems", IEEE Trans. on Consumer Elec., Vol. CE-25, No. 1, pp 9–44 (Feb. 1979) which is incorporated herein by reference.

In the baseband approach, a transmission channel is characterized (at least those parameters which contribute to signal interference and alteration) by transmitting a ghost cancellation reference signal (hereinafter referred to as a "GCR signal") having known characteristics over the transmission channel as part of a television signal. As a result, both the television signal and the GCR signal are subjected to the characteristics of the transmission channel. After reception and demodulation of the television signal, the received GCR signal (as altered by the channel characteristics) is compared to the original GCR signal, and filter coefficients reflecting the differences between the original and received GCR signals are calculated. These coefficients (hereinafter referred to as "ghost cancellation coefficients") are provided to digital IIR and/or FIR filters in order to model an inverse of the channel characteristics. These digital filters process the complete television signal using the inverse channel characteristics and thereby significantly reduce the effects of ghosts on the images obtained from the received television signal. Methods and apparatus working according to the baseband approach are described in U.S. Pat. Nos. 5,047,859, 5,111,298, 5,121,211, and 5,172,232, which are all incorporated herein by reference.

A problem with the baseband approach is its that its ability to perform ghost cancellation, and the quantity of such ghost cancellation when it can be performed, is limited by the reception quality of a television signal received by a television. Accordingly, if the television signal which is received by the television and supplied to a baseband ghost cancellation unit is of poor reception quality, the baseband ghost cancellation unit may either not be able to perform ghost cancellation on that signal, or if it can perform ghost cancellation, not be able to perform sufficient ghost cancellation to produce a television signal from which substantially ghost-free images can be obtained (that type of television signal is hereinafter referred to as a "ghost-free television signal").

In addition (and somewhat in accord with the adc approach), each time a viewer changes channels, new ghost cancellation coefficients must be calculated, since, as mentioned above, the characteristics of a transmission path varies from channel to channel. This provides a delay in ghost cancelling occurring each time a different channel is selected by a viewer.

SUMMARY OF THE INVENTION

By combining the adc and the baseband approaches together in accordance with the invention, improved ghost cancellation results can be obtained. More specifically, a ghost-free television signal can be produced from such a combination from a received television signal which ordinarily would not become a ghost-free television signal as a result of either separately changing the directionality of an antenna or supplying the received television signal to a baseband ghost cancellation unit. This is achieved, in accordance with the invention, by (automatically) setting the directionality of the antenna such that the television signal which is received is of sufficient reception quality that a baseband ghost cancellation unit can produce a ghost cancelled television signal which is a ghost-free television signal.

A tuning system in accordance with this aspect of the invention comprises: (a) an antenna unit having an antenna for receiving a television signal, the antenna being of a type whose directionality can be changed to change reception quality of the television signal; (b) a baseband ghost cancellation unit, coupled to the antenna unit, for receiving and performing baseband ghost cancellation on the television signal to produce a ghost cancelled television signal; and (c) a controller for controlling the directionality of the antenna so that reception quality of the television signal is sufficient that the ghost cancelled television signal is a ghost-free television signal.

A method in accordance with this aspect of the invention comprises: (a) receiving a television signal from an antenna whose directionality can be changed to change reception quality of the television signal; (b) baseband ghost cancelling the television signal to produce a ghost cancelled television signal; and (c) changing the directionality of the antenna until reception quality of the television signal is sufficient that the ghost cancelled television signal is a ghost-free television signal.

In addition, by coordinating the operations of the antenna and a tuner (and a baseband ghost cancellation unit, as well) together, a properly tuned ghost-free television signal can be produced. This is achieved, in accordance with the invention, by (automatically) the directionality of the antenna and the tuning frequency of the tuner such that the (tuned) television signal which is produced by the latter and supplied to the baseband ghost cancellation unit is properly tuned and of sufficient reception quality that the baseband ghost cancellation unit can produce a ghost cancelled television signal which is a properly tuned ghost-free television signal.

A tuning system in accordance with this aspect of the invention comprises: (a) an antenna unit having an antenna for receiving a television signal, the antenna being of a type whose directionality can be changed to change reception quality of the television signal; (b) a tuner, coupled to the antenna unit, for receiving and tuning the television signal to a tuning frequency to produce a tuned television signal; (c) a baseband ghost cancellation unit, coupled to the tuner, for receiving and performing baseband ghost cancellation on the tuned television signal to produce a ghost cancelled television signal; and (c) a controller for controlling the directionality of the antenna and the tuning frequency to which the television signal is tuned by the tuner so that the tuned television signal is properly tuned and of sufficient quality that the ghost cancelled television signal is a properly tuned ghost-free television signal.

A method in accordance with this aspect of the invention comprises: (a) receiving a television signal from an antenna whose directionality can be changed to change reception quality of the television signal; (b) tuning the television signal to a tuning frequency to produce a tuned television signal; (c) baseband ghost cancelling the tuned television signal to produce a ghost cancelled television signal; and (d) changing the directionality of the antenna and the tuning frequency to which the television signal is tuned until the tuned television signal is properly tuned and of sufficient quality that the ghost cancelled television signal is a properly tuned ghost-free television signal.

In accordance with what was stated above in the Background of the Invention section, each time a viewer selects a different channel, in accordance with the invention, the directionality of the antenna and the ghost cancellation coefficients will need to be changed in order to obtain a ghost-free television signal (and the tuning frequency of the tuner, as well, to obtain a properly tuned ghost-free televisions signal). Accordingly, it is desirable to store an antenna directionality setting (and a tuning frequency setting) and possibly ghost cancellation coefficients for each channel which will produce a (properly tuned) ghost-free television signal, after that (those) setting(s) and those coefficients have been obtained, so that each time a viewer changes to that channel the directionality of the antenna (and the tuning frequency) and the coefficients of the baseband ghost cancellation unit can be automatically set to produce a (properly tuned) ghost-free television signal. By providing the above-described systems with a storage device, that (those) setting (s) and coefficients can be stored once obtained. (Likewise, the above-described methods can also be modified to include a storing step.) Thereafter, they can be obtained and used to ensure production of a (properly tuned) ghost-free television signal.

A method in accordance with the invention for producing a ghost-free television signal from a television tuning system, including an antenna whose directionality can be changed to change reception quality of a television signal received by the antenna, and a baseband ghost cancellation unit for receiving and performing baseband ghost cancellation on the television signal to produce a ghost cancelled television signal, comprises: (a) obtaining a desired directionality setting for the antenna which will result in the television signal having sufficient reception quality that the ghost cancelled television signal produced therefrom is a ghost-free television signal; and (b) setting the directionality of the antenna to the desired directionality setting.

A method in accordance with the invention for producing a properly tuned ghost-free television signal from a television tuning system, including an antenna whose directionality can be changed to change reception quality of a television signal received by the antenna, a tuner for receiving and tuning the television signal to a tuning frequency to produce a tuned television signal and a baseband ghost cancellation unit for receiving and performing baseband ghost cancellation on the tuned television signal to produce a ghost cancelled television signal, comprises: (a) obtaining a desired directionality setting for the antenna and a desired tuning frequency setting for tuning the television signal to which will result in the tuned television signal being properly tuned and of sufficient quality that the ghost cancelled television signal produced therefrom is a properly tuned ghost-free television signal; and (b) setting the directionality of the antenna to the desired directionality setting, and the tuning frequency to which the television signal is tuned to the desired tuning frequency setting.

The desired directionality setting (and the desired tuning frequency setting) for those method can be obtained from a storage device. In addition, that (those) setting(s) can also be obtained by determining which setting(s) produces a (properly tuned) ghost cancelled television signal.

BRIEF DESCRIPTION OF THE DRAWINGS

The invention will now be described in greater detail with reference to the following illustrative drawings, in which.

DESCRIPTION OF THE PREFERRED EMBODIMENTS

Figure 1:
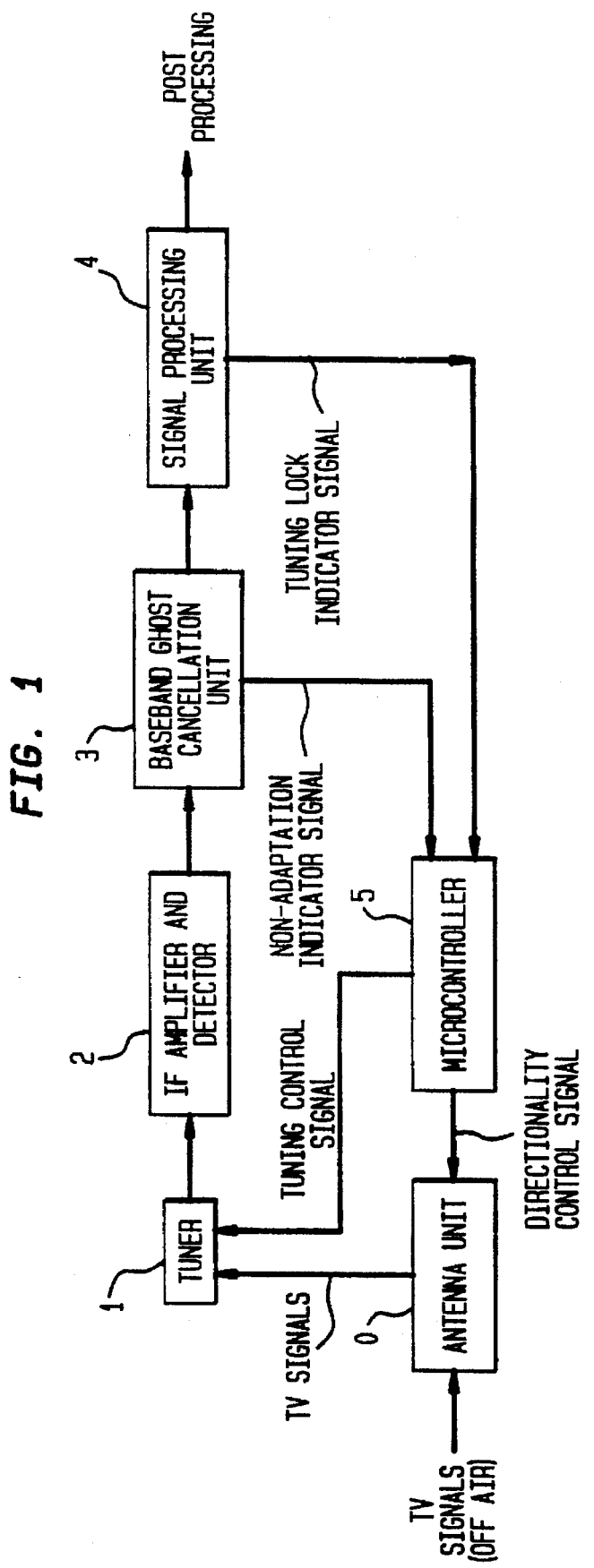
FIG. 1 is a block diagram of a television tuning system in accordance with the invention.

FIG. 1 shows a block diagram of a television tuning system in accordance with the invention. The system of FIG. 1 includes an antenna unit 0, a tuner 1, an IF amplifier and detector 2, a baseband ghost cancellation unit 3, a signal processing unit 4 and a microcontroller 5.

Antenna unit 0 is of a type which (a) receives television signals "from the air" via an antenna (not shown), and provides them to an output thereof, and (b) is capable of changing the directionality of the antenna, to change the reception quality of the television signals it receives, by either rotating the position of the antenna or adjusting the phase of the antenna. In addition to the above mentioned output, antenna unit 0 also has a control input coupled to a first output of microcontroller 5 for receiving a directionality control signal produced by microcontroller 5 for controlling the position or phase of the antenna (or both, if the antenna has the ability to change both).

The output of antenna unit 0 is coupled a first input of tuner 1 which receives the television signals. Tuner 1 is of a type known to those skilled in art which (a) receives television signals over a tuning frequency range (e.g., over the tuning frequency ranges of 181 channels), (b) tunes to a tuning frequency within the tuning frequency range, and (c) produces a tuned television signal at the tuning frequency. In addition to its first input, the tuner 1 also has a control input coupled to a second output of microcontroller 5 for receiving a tuning control signals produced by microcontroller 5 for controlling the frequency at which tuner 1 is set, and an output for supplying the tuned television signal.

The output of tuner 1 is coupled to an input of IF amplifier and detector 2 which receives the tuned television signal. IF amplifier and detector 2 is of a type known to persons skilled in the art which (a) receives the tuned television signal, (b) increases its strength and (c) and converts it into a baseband television signal, which is made available at an output of IF amplifier and detector 2.

The output of IF amplifier and detector 2 is coupled to an input of baseband ghost cancellation unit 3 which receives the baseband television signal. The baseband ghost cancellation unit 3 also has (a) a first output for supplying a ghost cancelled television signal produced therein from the baseband television signal, and (b) a second output for supplying to a first input of microcontroller 5 an non-adaption indicator signal when the baseband ghost cancellation unit (i) is not capable of performing ghost cancellation or (ii) is unable to provide sufficient ghost cancellation to produce a ghost cancelled television signal which is a ghost-free television signal. In-other-words, the non-adaption indictor signal is produced by baseband ghost cancellation unit 3 when the baseband ghost cancellation unit is unable to produce a ghost-free television signal.

Since a detailed discussion of baseband ghost cancellation units is provide in U.S. Pat. Nos. 5,047,859, 5,111,298, 5,121,211, and 5,172,232, which, as stated above, are all incorporated herein by reference, a detailed discussion of baseband ghost cancellation unit 3 is unnecessary. Nevertheless, to aid in the understanding of the invention, and in particular when the non-adaption indicator signal is produced, a simplified version of baseband ghost cancellation unit 3 is shown in FIG. 2 and now briefly discussed.

Figure 2:
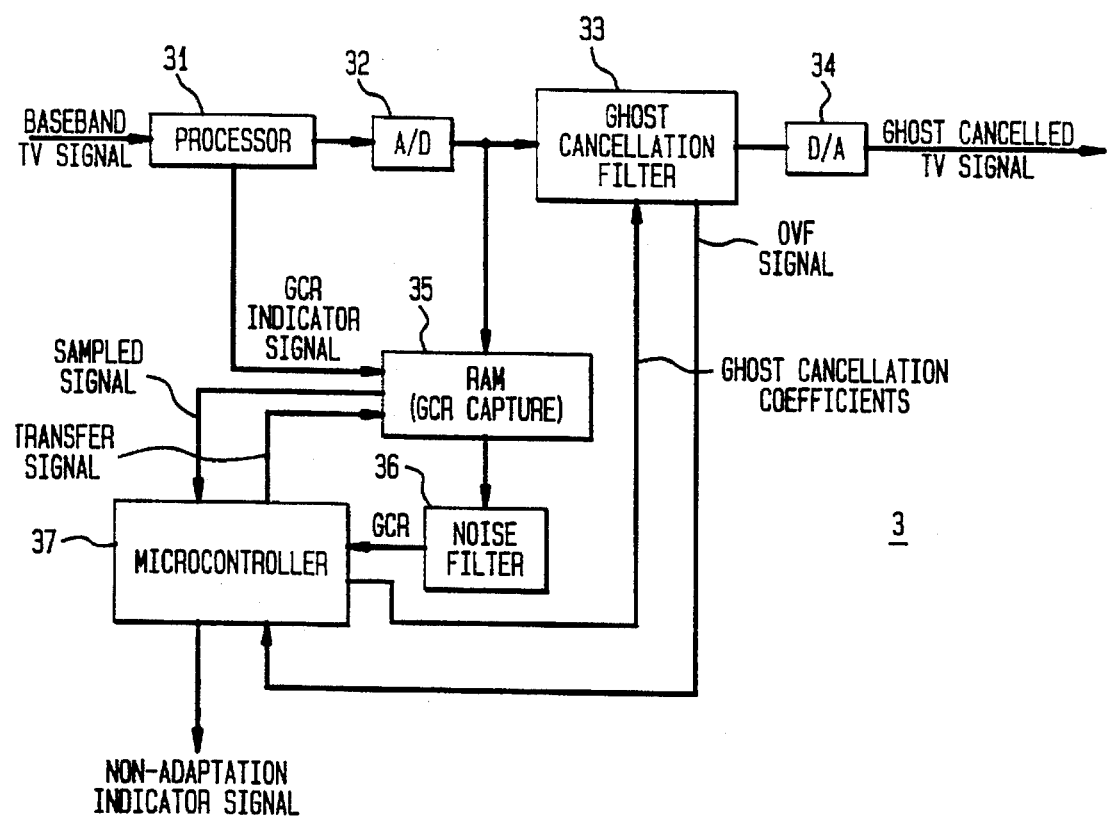
FIG. 2 is a block diagram of a baseband ghost cancellation unit used in accordance with the invention.

Baseband ghost cancellation unit 3 of FIG. 2 includes a processor 31, an A/D converter 32, a ghost cancellation filter 33, a D/A converter 34, a RAM 35, a noise filter 36 and a microcontroller 37. The processor 31 has an input (which is the input of the baseband ghost cancellation unit 3 of FIG. 1), coupled to the output of the IF amplifier and detector of FIG. 1, for receiving the baseband television signal produced by IF amplifier and detector 2. The processor 31 (a) generates timing signals (only one of which is shown) from the baseband television signal for controlling timing functions of baseband ghost cancellation unit 3, and (b) supplies the baseband television signal via a first output to an input of A/D converter 32. A/D converter 32 converts the baseband television signal into a digital television signal.

One of the timing signals produced by the processor 31 is a GCR indicator signal which indicates where within the digital television signal the (now digital) GCR signal (which must be transmitted along with the transmitted original television signal in order for the baseband ghost cancellation unit used in accordance with the invention to be used and operated in accordance with the invention) is supposed to be located. On the basis of the GCR indicator signal, which is supplied from a second output of the processor 31 to a first input of RAM 35, RAM 35 samples, via a second input coupled to the output of the A/D converter 32, the digital television signal at the location where the (digital) GCR signal is supposed to be located. RAM 35 has a first output, coupled to a first input of microcontroller 37, for supplying the signal that it sampled to the microcontroller 37. If microcontroller 37 determines that the sampled signal corresponds to the (digital) GCR signal, then it supplies a transfer signal to RAM 35, via a first output of microcontroller 37 coupled to a third input of RAM 35. When the transfer signal is received by RAM 35, it supplies the (digital) GCR signal to noise filter 36, via a second output of RAM 35 coupled to an input of noise filter 36, which filters the (digital) GCR signal to remove noise. Thereafter, the noise reduced (digital) GCR signal is supplied to microcontroller 37, via an output of the noise filter 36 to a second input of microcontroller 37, so that microcontroller 37 can determine ghost cancellation coefficients for ghost cancellation filter 33.

Ghost cancellation filter 33 has a first input coupled to the output of A/D converter 32 for receiving the digital television signal, and a second input coupled to a second output of microcontroller 37 for receiving the ghost cancellation coefficients. Ghost cancellation filter 33 can be a filter like the Zoran ZR33072 72-Tap Video-Rate Digital (Ghost Cancellation) Filter which is capable of performing baseband ghost cancellation on the digital television signal it receives on the basis of the ghost cancellation coefficients it receives. In addition, ghost cancellation filter 33 has a second output, coupled to a third input of the microcontroller 37, for producing an overflow ("OVR") signal, like the Zoran ZR33072 filter, whenever ghost cancellation filter 33 is not producing a ghost cancelled digital television signal from which substantially ghost-free images can be produced as a result of (a) the digital television signal and/or (b) the ghost cancellation coefficients ghost cancellation filter 33 receives and uses. Ghost cancellation filter 33 also has a second output, coupled to an input of D/A converter 34, for supplying the ghost cancelled digital television signal to D/A converter 34 for conversion back into an analog signal, i.e., into a ghost cancelled television signal. The ghost cancelled television signal is available at an output of the D/A converter 34 (which corresponds to the first output of the ghost cancellation unit 3 of FIG. 1).

Microcontroller 37 of FIG. 2 can be a microprocessor, PROM, etc. which in addition to determining the ghost cancellation coefficients for use by the ghost cancellation filter 33 is also able to produce the non-adaption indicator signal at a third output (which corresponds to the second output of the baseband ghost cancellation unit 3 of FIG. 1) whenever baseband ghost cancellation unit 3 is unable to produce a ghost-free television signal. In a preferred embodiment, microcontroller 37 produces the non-adaption indicator signal in the following situations:

(a) when RAM 35 does not capture the (digital) GCR signal;

(b) when the signal to noise ratio of the noise reduced (digital) GCR signal is above a certain threshold, e.g., 25 dB;

(c) when the ghost cancellation filter 33 produces the OVR signal.

It is noted that the situations in which the ghost cancellation filter 33 will produce the OVR signal will vary depending upon the capabilities of that filter. In addition, it is also noted that baseband ghost cancellation unit 3 of FIG. 2 could also include a signal evaluation unit or processor (not shown) coupled to the second output of the ghost cancellation filter 33 or the output of the D/A converter 34 for measuring the quality of the signal at either, and supplying a triggering signal to the microcontroller 37 to produce the non-adaption indicator signal if the signal at either output is deemed to be of a quality which would not enable ghost-free images to be obtained from that signal.

The first output of baseband ghost cancellation unit 3 of FIG. 1 is coupled to an input of signal processing unit 4 which receives the ghost cancelled television signal. Signal processing unit 4 is of a type known to those skilled in the art. For purposes of this discussion and the invention, the only functions which signal processing unit 4 needs to perform are (a) to determine if the ghost cancelled television signal is properly tuned, on the basis of specific signal characteristics known to persons skilled in the art, and (b) if so, to provide a tuning lock indicator signal at a first output thereof. The first output of signal processing unit 4 is coupled to a second input of microcontroller 5. Signal processing unit 4 also has a second output for making the ghost cancelled television signal available for further post processing.

Microcontroller 5, which can be a microprocessor, PROM, etc. and is coupled to antenna control unit 0, tuner 1, baseband ghost cancellation unit 3 and signal processing unit 4, operates to cause the system of FIG. 1 to operate in accordance with the invention. Specifically, microcontroller 5 controls the operations of antenna unit 0 and tuner 1 to ensure that the system produces a properly tuned ghost-free television signal.

Figure 3:
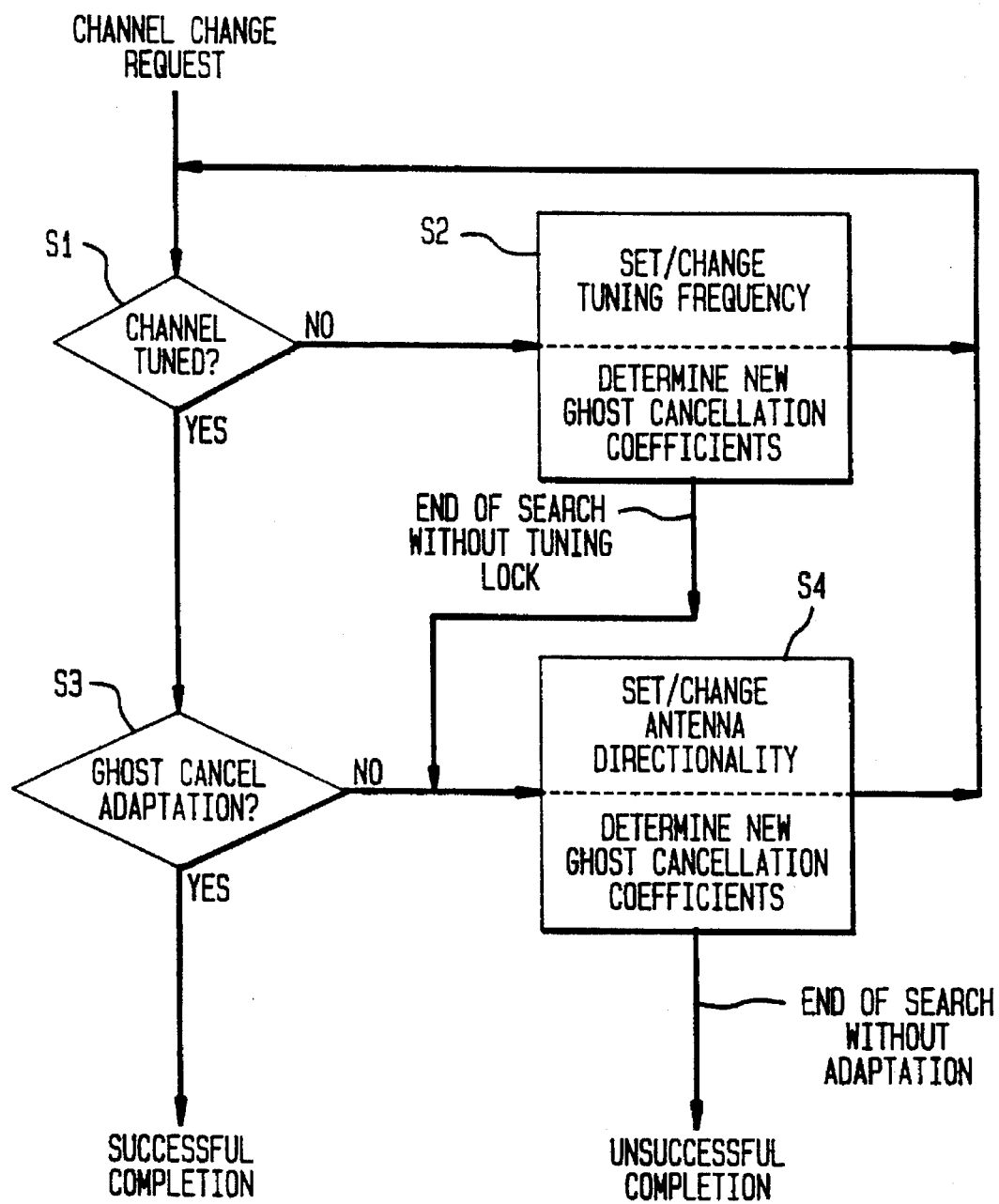
FIG. 3 is a flow chart showing a method in accordance with the invention.

FIG. 3 shows a method in accordance with the invention which my be performed by microcontroller 5. (For clarity purposes, the method of FIG. 3 is being discussed in terms of the system of FIG. 1.)

The method of FIG. 3 begins either when a television having a system such as the one shown in FIG. 1 is turned on or a channel change request or selection is made by a viewer. (Since when a television is first turned on it typically selects the previous channel which it had been tuned to, turning on the television is essentially the same as requesting or selecting a channel change. Accordingly, hereinafter, "channel change request" will refer to either turning on a television having a system in accordance with the invention or requesting or selecting a channel change.) It should be noted that when the method in accordance with the invention begins, the antenna of antenna unit 0 is either (a) set at a predetermined rotational position or setting, or phase position or setting, or (b) a previously set rotational position or setting, or phase position or setting.

Once a channel change request has been made, step S1 of FIG. 3 is performed. In step S1, microcontroller 5 of FIG. 1 determines whether a requested channel (e.g., channel 4) is tuned in on the basis of whether it receives the tuning lock indicator signal from signal processing unit 4.

If tuning locked in has not occurred, then step S2 of FIG. 3 is preformed. In step S2, microcontroller 5 causes tuner 1 to be set to a particular tuning frequency via a tuning control signal. This in turn causes baseband ghost cancellation unit 3 to determine ghost cancellation coefficients for use in performing ghost cancellation on the baseband television signal which results from the tuned television signal produced by tuner 1 being set to the particular tuning frequency.

In a preferred embodiment, the first time step S2 is performed after a channel change request occurs (or the directionality of the antenna has been changed (see below)), microcontroller 5 causes tuner 1 to be set to an initial tuning frequency. Preferably, the initial tuning frequency is the lowest frequency in the tuning frequency range for the requested channel (e.g., if channel 4, which has a tuning frequency range of between 66 and 68 MHz, is requested, then the initial tuning frequency would be 66 MHz).

Once tuner 1 has been set to the initial tuning frequency, step S1 is performed again. If it is determined that the requested channel is not tuned in, then step S2 is repeat. This time, in the preferred embodiment, however, microprocessor 5 (in step S2) causes tuner 1 to be set to a different tuning frequency which is an incremental increase from the initial tuning frequency. Thereafter step S1 is repeated again, and, if tuning lock in has not occurred, then step S2 is also repeated again. Each time step S2 is performed after tuner 1 is set at the initial tuning frequency, the tuning frequency which microcontroller 5 cause tuner 1 to be set at is an incremental increase from the previous tuning frequency which tuner 1 is set at. The incremental increase is preferably 62.5 KHz. Steps S1 and S2 are repeated in the previously described manner until (a) the requested channel is tuned in or (b) tuner 1 has been incremented to the highest tuning frequency in the tuning frequency range of the requested channel without tuning lock in having occurred.

If tuning lock in for the requested channel has occurred, then step S3 of FIG. 3 is performed. In step S3, a determination is made as to whether ghost cancellation adaption has occurred, i.e. whether baseband ghost cancellation unit 3 is able to produce a ghost-free television signal. As mentioned above, this determination is made by baseband ghost cancellation unit 3, and the results thereof are provided by whether microprocessor 37 produces and microprocessor 5 receives the non-adaption indicator signal.

If ghost cancellation adaption has not occurred, i.e., the non-adaption indicator signal has been received by microprocessor 5, then step S4 of FIG. 3 is preformed. In step S4, microcontroller 5 causes antenna unit 0 to change the directionality, i.e., the position or phase, of the antenna by a predetermined amount, e.g., one rotational position or setting, or one phase position or setting. This in turn causes baseband ghost cancellation unit 3 to determine ghost cancellation coefficients for use in performing ghost cancellation on the baseband television signal which results from the change in directionality.

Once step S4 has been performed, step S1 is repeated. If tuning lock in does not occur, then steps S3 is repeated. If tuning lock in does not occur (in step S1), then steps S2 and S1 are repeated until either (a) tuning lock in occurs or (b) tuner 1 has been incremented through the entire tuning frequency range of the requested channel without tuning lock in having occurred. If tuning lock does occur (in step S1), then step S3 is repeated. If at that point ghost cancellation adaption does not occur, then step S4 is repeated and the directionality of the antenna is changed again.

Step S4, followed by steps S1–S3 (as necessary) are repeated until (a) ghost cancellation adaption occurs (i.e., baseband ghost cancellation unit 3 is able to produced a ghost-free television signal for a tuned in requested channel) or (b) the directionality of the antenna has been set at every rotational position or setting, or phase position or setting without ghost cancellation adaption having occurred. If in step S3, it is determined that ghost cancellation adaption has occurred, then the desired result is obtained from the system of FIG. 1, i.e., production of a properly tuned ghost-free television signal.

Since the system in accordance with the invention is capable of automatically changing the directionality of the antenna of antenna unit 0 to enable baseband ghost cancellation unit 3 to produce a ghost-free television signal, the system can also make use of that capability to aid in tuning. Accordingly, if tuner 1 has been incremented though the entire tuning frequency range of a requested channel without tuning lock in having occurred, then the system can operate to change the directionality of the antenna to enable reception of a television signal which can be locked in. This procedure is incorporated into the method of FIG. 3. Specifically, if step S2 of FIG. 3 has been performed enough times so that tuner 1 has been incremented to the highest tuning frequency in the tuning frequency range of the requested channel without tuning lock in having occurred, then step S4 is performed, and the directionality of the antenna is changed.

It is noted that the above-described processes for changing the directionality of the antenna and the tuning frequency of the tuner are only one way of performing each. Persons skilled in the art will be aware of numerous other ways of changing both so that all or substantially all (a) rotational setting or positions, or phase settings or positions (collectively referred to as "directionality setting") of an antenna, and (b) tuning frequencies in the tuning frequency range of a requested channel in combination are tried so that a properly tuned ghost-free television signal can be produced.

Although the method described above with reference to FIG. 3 is extremely beneficial in finding a directionality setting, tuning frequency setting, and even ghost cancellation coefficients (the latter being obtainable from microcontroller 37 of FIG. 2) which will produce a properly tuned ghost-free television signal for a requested channel (such settings and coefficients hereinafter collectively referred to as "desired setting information"), the desired setting information must be obtain each time a different channel is requested. Since time is required to obtain the desired setting information for each channel, it is desirable to store and use that information after it has been obtained (unless there is a change in the transmission path or the channel characteristics), each time that channel is requested. An embodiment of a system in accordance with the invention which can perform the task of obtaining the desired setting information for each channel, storing that information and then utilizing that information when that channel is again requested is shown in FIG. 4.

Figure 4:
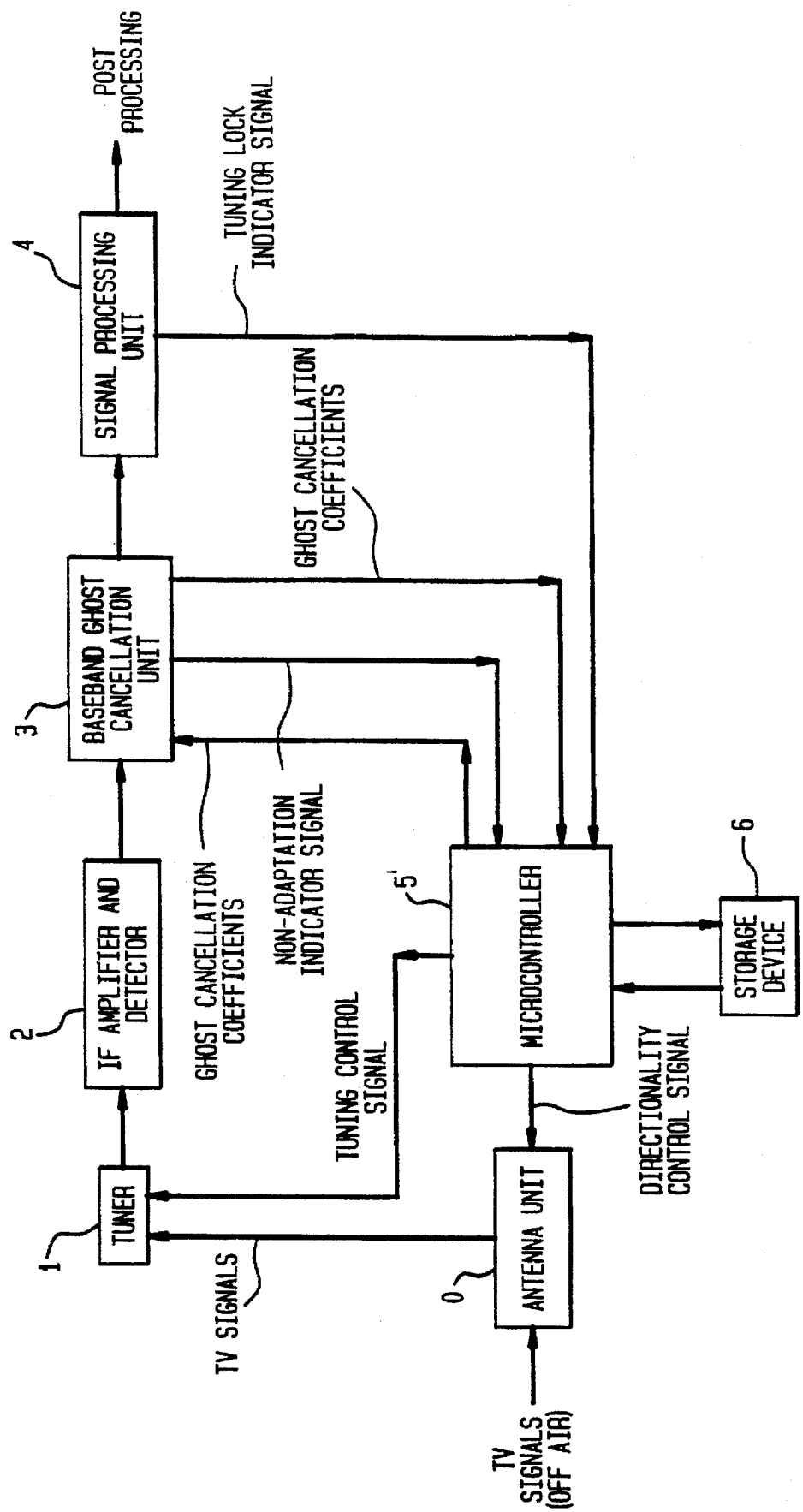
FIG. 4 is a block diagram of another embodiment of a television tuning system in accordance with the invention.

The tuning system shown in FIG. 4 is essentially the same as the tuning system shown in FIG. 1 (like elements having the same reference numbers), except that the system shown in FIG. 4 also includes a storage device 6 coupled a microcontroller 5' via two communication paths, and additional communication paths between baseband ghost cancellation unit 3 and microcontroller 5'. In addition, the system shown in FIG. 3 operates in substantially the same way as the system shown in FIG. 1, except for the feature discussed hereinafter.

Storage device 6 is a non-volatile memory unit, such as a RAM or the like, which is capable of (a) storing the desired setting information for each channel which a television can receive (e.g., 181), and (b) providing that information when requested to microprocessor 5'. Storage device 6 has an input for receiving the desired setting information for a requested channel from a fourth output of microprocessor 5', and an output for providing the desired setting information for a requested channel stored therein to microcontroller 5' via a fourth input coupled to the output of the storage device 6.

Microcontroller 5', like microcontroller 5 of FIG. 1 is a microprocessor, PROM or the like. Microcontroller 5' operates in substantially the same manner as microcontroller 5 (described above), but is also capable of (a) receiving the ghost cancellation coefficients which produce a (properly tuned) ghost-free television signal for each requested channel from baseband ghost cancellation unit 3 (in particular, microcontroller 37 of FIG. 2); (b) providing the desired setting information for each channel the first time that channel it is requested to storage device 6 for storage therein; and (c) (i) retrieving the desired setting information for each channel from storage device 6 after that information has been stored in storage device 6, and (ii) using that information to set the directionality of the antenna of antenna unit 0, the tuning frequency of tuner 1 and the baseband ghost cancellation unit 3 (via setting its ghost cancellation coefficients) so that the system will produce a (properly tuned) ghost-free television signal. In a preferred embodiment, microcontroller 5' can be programmed to perform the method shown and described with respect to FIG. 3 for each of the channels which a television including a tuning system in accordance with the invention can obtain individually during a television set-up operation to obtain the desired setting information for each channel.

Figure 5:
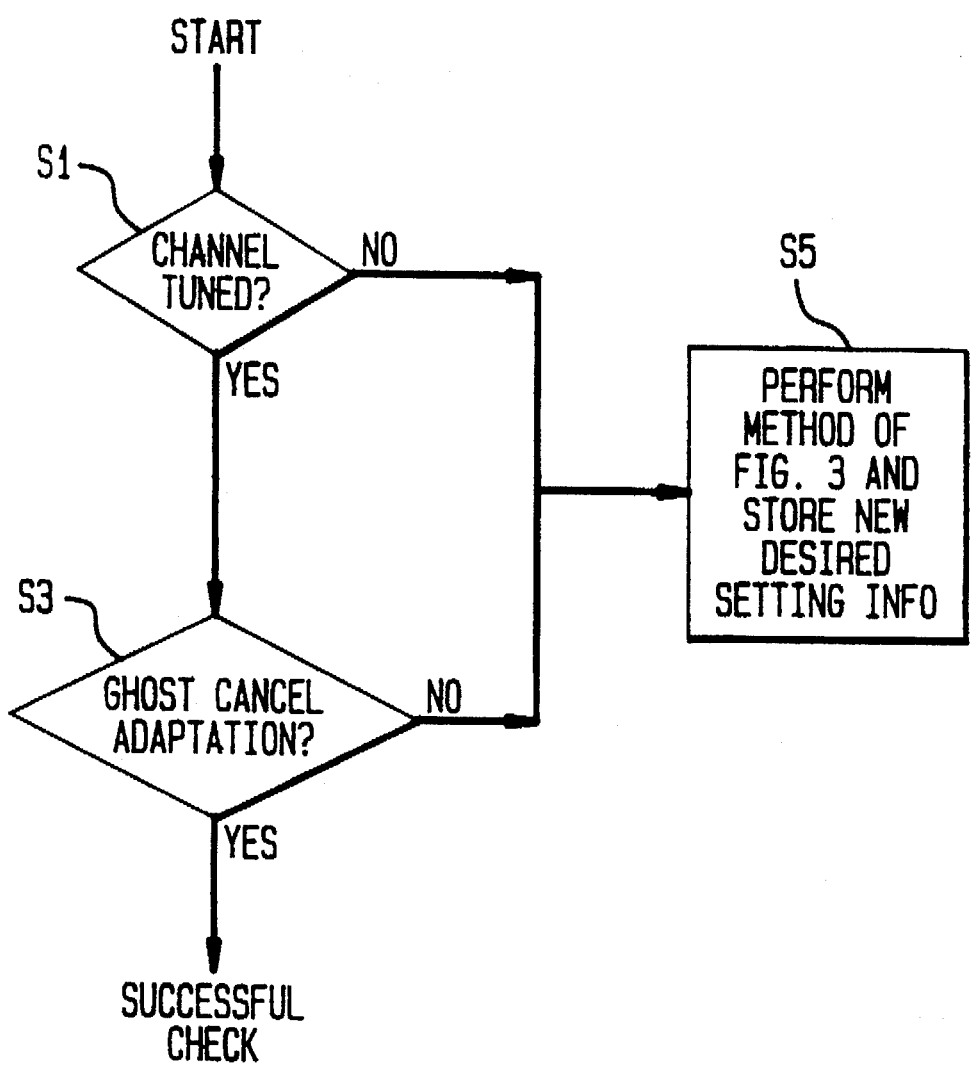
FIG. 5 is a flow chart of a method employed by the system shown in FIG. 4 for checking whether it will produce a properly tuned ghost-free television signal.

After the desired setting information for a requested channel has been stored in storage device 6 and is being used to control the system of FIG. 4, it is possible and beneficial to have microcontroller 5' periodically run through a check/update desired setting information method to make sure that stored and used desired setting information for a requested channel is resulting in the tuning system producing a (properly tuned) ghost-free television signal, and if not, for updating that information. FIG. 5 shows such a method.

The method of FIG. 5 begins with step S1 of FIG. 3, i.e., a determination is made as to whether tuner 1 is tuned in. If it is, then steps S3 of FIG. 3 is performed, i.e., a determination is made as to whether ghost cancellation adaption has occurred. If it has, then a successful check has occurred. If, in the method of FIG. 5, it is determined that either tuner 1 is not tuned in (step S1) or ghost cancellation adaption has not occurred (step S3), then step S5 if performed. Step S5 involves repeating the method shown in FIG. 3 for a requested channel and then storing the new desired setting information in the storage device 6 for latter retrieval and use.

Finally, it is noted that invention is not limited to the embodiments shown or discussed herein. Modifications and variations may be made by persons skilled in the art.

What is claimed is:

1. A television system, comprising:

an antenna unit having an antenna for receiving a television signal, said antenna being of a type whose directionality can be changed to change reception quality of the television signal;

a baseband ghost cancellation unit, coupled to said antenna unit, for receiving and performing baseband ghost cancellation on the television signal to produce a ghost cancelled television signal; and control means for causing the directionality of said antenna to be changed when the ghost cancelled television signal is not a ghost-free television signal until reception quality of the television signal is sufficient that the ghost cancelled television signal is a ghost-free television signal.

2. The system as claimed in claim 1, wherein said antenna is either a rotatable antenna or a phase adjustable antenna, and said antenna unit further has antenna directionality change means for changing the directionality of said antenna, under the control of said control means, by rotating the position or adjusting the phase of said antenna.

3. The system as claimed in claim 1, wherein said antenna is set at a desired directionality setting when the ghost cancelled television signal is a ghost-free television signal; and the system further comprises storage means for storing the desired directionality setting.

4. The system as claimed in claim 3, wherein said baseband ghost cancellation unit produces ghost cancellation coefficients for use therein in producing the ghost cancelled television signal which is a ghost-free television signal; and said storage means further stores the ghost cancellation coefficients.

5. The system as claimed in claim 1, wherein said control means determines whether the ghost cancelled television signal is a ghost-free television signal.

6. The system as claimed in claim 5, wherein said baseband ghost cancellation unit includes non-adaption means for producing a non-adaption signal if the ghost cancelled television signal is not a ghost-free television signal, and said control means determines whether the ghost cancelled television signal is a ghost-free television signal on the basis of whether said non-adaption means produces the non-adaption signal.

7. A television tuning method, comprising:

receiving a television signal from an antenna whose directionality can be changed to change reception quality of the television signal;

baseband ghost cancelling the television signal to produce a ghost cancelled television signal; and changing the directionality of the antenna when the ghost cancelled television signal is not a ghost-free television signal until reception quality of the television signal is sufficient that the ghost cancelled television signal is a ghost-free television signal.

8. The method as claimed in claim 7, wherein the antenna is set at a desired directionality setting when the ghost cancelled television signal is a ghost-free television signal; and the method further comprises storing the desired directionality setting in a storage device.

9. The method as claimed in claim 8, wherein in performing said baseband ghost cancellation to produce the ghost cancelled television signal which is a ghost-free television signal, ghost cancellation coefficients are produced for use in performing such baseband ghost cancellation; and said method further comprises storing the ghost cancellation coefficients.

10. The method as claimed in claim 7, further comprising determining whether the ghost cancelled television signal is a ghost-free television signal.

11. The method as claimed in claim 10, wherein said baseband ghost cancelling is performed by means of a baseband ghost cancellation unit, and said determining whether the ghost cancelled television signal is a ghost-free television signal is made on the basis of whether said baseband ghost cancellation unit indicates that the ghost cancelled television signal is not a ghost-free television signal.

12. A method of producing a ghost-free television signal from a television tuning system, including an antenna whose directionality can be changed to change reception quality of a television signal received by the antenna, a baseband ghost cancellation unit for receiving and performing baseband ghost cancellation on the television signal, with the aid of ghost cancellation coefficients, to produce a ghost cancelled television signal and a storage device, the method comprising:

obtaining from the storage device (a) a desired directionality setting for the antenna which will result in the television signal having sufficient reception quality that the ghost cancelled television signal produced therefrom can be a ghost-free television signal, and (b) desired ghost cancellation coefficients which result in the ghost cancelled television signal being a ghost free-television signal when the antenna is set at the desired directionality setting;

setting the directionality of the antenna to the desired directionality setting; and supplying the desired ghost cancellation coefficients to the baseband ghost cancellation unit for use therein in producing the ghost cancelled television signal which is a ghost-free television signal.

13. The method as claimed in claim 12, wherein the desired directionality setting and the desired ghost cancellation coefficients obtained from the storage device were previously obtained as a result of changing the directionality of the antenna until the ghost cancelled television signal was a ghost-free television signal and then stored in the storage device.

14. A television tuning system, comprising:

an antenna unit having an antenna for receiving a television signal, said antenna being of a type whose directionality can be changed to change reception quality of the television signal;

a tuner, coupled to said antenna unit, for receiving and tuning the television signal to a tuning frequency to produce a tuned television signal;

a baseband ghost cancellation unit, coupled to said tuner, for receiving and performing baseband ghost cancellation on the tuned television signal to produce a ghost cancelled television signal; and control means for controlling the directionality of said antenna and the tuning frequency to which the television signal is tuned by said tuner so that the tuned television signal is properly tuned and of sufficient quality that the ghost cancelled television signal is a properly tuned ghost-free television signal.

15. The system as claimed in claim 14, wherein said antenna is either a rotatable antenna or a phase adjustable antenna, and said antenna unit further has antenna directionality change means for changing the directionality of said antenna, under the control of said control means, by rotating the position or adjusting the phase of said antenna.

16. The system as claimed in claim 14, wherein said antenna is set at a desired directionality setting and the tuning frequency to which the television signal is tuned is at a desired tuning frequency setting when the ghost cancelled television signal is a properly tuned ghost-free television signal; and the system further comprises storage means for storing the desired directionality setting and the desired tuning frequency setting.

17. The system as claimed in claim 16, wherein said baseband ghost cancellation unit produces ghost cancellation coefficients for use therein in producing the ghost cancelled television signal which is a properly tuned ghost-free television signal; and said storage means further stores the ghost cancellation coefficients.

18. The system as claimed in claim 14 wherein said control means (a) determines (i) whether the ghost cancelled television signal is a ghost-free television signal, and/or (ii) whether the television signal can be properly tuned; and (b) causes the directionality of said antenna to be changed (i) when the ghost cancelled signal is not a ghost-free television signal, and/or (ii) when the television signal cannot be properly tuned.

19. The system as claimed in claim 14, wherein said control means (a) determines whether the ghost cancelled television signal is a ghost-free television signal, and (b) causes the directionality of said antenna to be changed when the ghost cancelled television signal is not a ghost-free television signal until reception quality of the television signal is sufficient that the ghost cancelled television signal is a ghost-free television signal.

20. The system as claimed in claim 19, wherein said baseband ghost cancellation unit includes non-adaption means for producing a non-adaption signal if the ghost cancelled television signal is not a ghost-free television signal, and said control means determines whether the ghost cancelled television signal is a ghost-free television signal on the basis of whether said non-adaption means produces the non-adaption signal.

21. A television tuning method, comprising:
receiving a television signal from an antenna whose directionality can be changed to change reception quality of the television signal;
tuning the television signal to a tuning frequency to produce a tuned television signal;
baseband ghost cancelling the tuned television signal to produce a ghost cancelled television signal; and
changing the directionality of the antenna and the tuning frequency to which the television signal is tuned until the tuned television signal is properly tuned and of sufficient quality that the ghost cancelled television signal is a properly tuned ghost-free television signal.

22. The method as claimed in claim 21, wherein said antenna is set at a desired directionality setting and the tuning frequency to which the television signal is tuned is at a desired tuning frequency setting when the ghost cancelled television signal is a properly tuned ghost-free television signal; and the method further comprises storing the desired directionality setting and the desired tuning frequency setting in a storage device.

23. The method as claimed in claim 22, wherein in performing said baseband ghost cancellation to produce the ghost cancelled television signal which is a properly tuned ghost-free television signal, ghost cancellation coefficients are produced for use in performing such baseband ghost cancellation; and said method further comprises storing the ghost cancellation coefficients.

24. The method as claimed in claim 21, further comprising determining whether (a) whether the television signal can be properly tuned and/or (b) whether the ghost cancelled television signal is a ghost-free television signal.

25. The method as claimed in claim 21, wherein said baseband ghost cancelling is performed by means of a baseband ghost cancellation unit, and the method further comprises determining whether the ghost cancelled television signal is a ghost-free television signal on the basis of whether said baseband ghost cancellation unit indicates that the ghost cancelled television signal is not a ghost-free television signal.

26. A method of producing a properly tuned ghost-free television signal from a television tuning system, including an antenna whose directionality can be changed to change reception quality of a television signal received by the antenna, a tuner for receiving and tuning the television signal to a tuning frequency to produce a tuned television signal and a baseband ghost cancellation unit for receiving and performing baseband ghost cancellation on the tuned television signal to produce a ghost cancelled television signal, the method comprising obtaining a desired directionality setting for the antenna and a desired tuning frequency setting for tuning the television signal to which will result in the tuned television signal being properly tuned and of sufficient quality that the ghost cancelled television signal produced therefrom is a properly tuned ghost-free television signal; and setting the directionality of the antenna to the desired directionality setting, and the tuning frequency to which the television signal is tuned to the desired tuning frequency setting.

27. The method as claimed in claim 26, wherein the desired directionality setting and the desired tuning frequency setting are obtained by changing the directionality of the antenna and the tuning frequency to which the television signal is tuned until the ghost cancelled television signal is a properly tuned ghost-free television signal.

28. The method as claimed in claim 26, wherein the tuning system further includes a storage device, and the desired directionality setting and the desired tuning frequency setting are obtained from the storage device.

29. The method as claimed in claim 28, wherein the baseband ghost cancellation unit performs ghost cancellation on the basis of ghost cancellation coefficients, and the method further comprises:

obtaining desired ghost cancellation coefficients from the storage device which will result in the ghost cancelled television signal being a properly tuned ghost-free television signal; and supplying the desired ghost cancellation coefficients to the baseband ghost cancellation unit for use therein in producing the ghost cancelled television signal which is a properly tuned ghost-free television signal.

30. A receiver, adapted for coupling to an antenna of a type whose directionality can be changed, comprising:
a ghost cancelling unit for suppressing ghosting in a signal received from the antenna; and
control means for causing the directionality of the antenna to be changed in response to a non-adaption indicator signal from the ghost cancelling unit indicating that the ghosting has not been sufficiently suppressed.

31. A method of receiving a signal, comprising:

receiving a signal "from the air" by means of an antenna whose directionality can be changed;

effecting a ghost cancelling on the signal; and determining whether sufficient ghost cancelling has occurred, and if not, having the directionality of the antenna automatically changed by means of a device which can do so until sufficient ghost cancelling occurs.

* * * * *